US011080122B2

(12) United States Patent
Leitner et al.

(10) Patent No.: US 11,080,122 B2
(45) Date of Patent: Aug. 3, 2021

(54) SOFTWARE-INVISIBLE INTERRUPT FOR A MICROPROCESSOR

(71) Applicant: International Business Machines Corporation, Armonk, NY (US)

(72) Inventors: Larry Leitner, Austin, TX (US); John A. Schumann, Austin, TX (US); Debapriya Chatterjee, Austin, TX (US); Wallace Sharp, Round Rock, TX (US); Bryant Cockcroft, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 16/575,697

(22) Filed: Sep. 19, 2019

(65) Prior Publication Data
US 2021/0089382 A1 Mar. 25, 2021

(51) Int. Cl.
*G06F 11/00* (2006.01)
*G06F 11/07* (2006.01)
*G06F 9/48* (2006.01)

(52) U.S. Cl.
CPC ........ *G06F 11/0772* (2013.01); *G06F 9/4812* (2013.01); *G06F 11/0793* (2013.01)

(58) Field of Classification Search
CPC . G06F 9/4812; G06F 11/0772; G06F 11/0793
See application file for complete search history.

(56) References Cited

U.S. PATENT DOCUMENTS

| 5,867,397 | A | * | 2/1999 | Koza | G06N 3/126 703/14 |
| 6,745,321 | B1 | * | 6/2004 | Floyd | G06F 9/3836 710/267 |
| 7,716,521 | B1 | | 5/2010 | Donahue et al. | |
| 7,721,148 | B2 | | 5/2010 | Brenden et al. | |
| 7,904,751 | B2 | | 3/2011 | Marisetty et al. | |
| 8,635,492 | B2 | | 1/2014 | Gara et al. | |
| 9,262,270 | B2 | | 2/2016 | Jayaprakash Bharadwaj et al. | |
| 2003/0074601 | A1 | * | 4/2003 | Schultz | G06F 11/0793 714/15 |
| 2003/0126498 | A1 | * | 7/2003 | Bigbee | G06F 11/0724 714/10 |

(Continued)

OTHER PUBLICATIONS

Anonymous, "Method for handling long running sequences of operations onrelational database" ip.com, IPCOM000221306D, Sep. 4, 2012 (16 pages).

(Continued)

*Primary Examiner* — Joshua P Lottich
(74) *Attorney, Agent, or Firm* — Cantor Colburn LLP; Bryan Bortnick

(57) ABSTRACT

Examples described herein provide a computer-implemented method that includes executing, by the microprocessor, instructions in an instruction stream of the microprocessor. The method further includes triggering, by control logic of the microprocessor, error condition monitoring logic. The method further includes executing, by the error condition monitoring logic of the microprocessor, an error instruction stream built into the microprocessor to break the microprocessor out of an error condition.

8 Claims, 4 Drawing Sheets

(56) References Cited

U.S. PATENT DOCUMENTS

| | | | |
|---|---|---|---|
| 2003/0217222 A1* | 11/2003 | Deutscher | G06F 11/0739 711/103 |
| 2007/0088916 A1* | 4/2007 | Jacobson | G06F 9/542 711/141 |
| 2014/0189310 A1* | 7/2014 | Tuck | G06F 11/0721 712/209 |

OTHER PUBLICATIONS

IBM, "Filtered Error Handling During Error Recovery" ip.com, IPCOM000035360D, Jan. 20, 2005 (4 pages).
Intel® Itanium® Architecture Software Developer's Manual; vol. 2: System Architecture; Revision 2.3; May 2010 (676 pages).

* cited by examiner

SOFTWARE-INVISIBLE INTERRUPT FOR A MICROPROCESSOR

BACKGROUND

The present invention generally relates to microprocessors, and more specifically, to a software-invisible interrupt for a microprocessor.

Microprocessors are electronic devices used by a computing device to perform work. A microprocessor combines, on a single integrated circuit chip, many different physical electronic components (e.g., transistors, resistors, diodes, etc.) to act as a central processing unit for processing instructions stored on a memory associated with the microprocessor. Microprocessors fetch instructions from the memory into the microprocessor, decode the instructions, and execute the instructions. Microprocessors generally include an arithmetic logic unit (ALU), register array, and control unit to perform the fetching, decoding, and executing. Microprocessors include logic built into the microprocessor to perform the fetching, decoding, and executing, for example, as well as potentially other functions.

SUMMARY

Embodiments of the present invention are directed to software-invisible interrupt for a microprocessor.

A non-limiting example computer-implemented method includes executing, by the microprocessor, instructions in an instruction stream of the microprocessor. The method further includes triggering, by control logic of the microprocessor, error condition monitoring logic. The method further includes executing, by the error condition monitoring logic of the microprocessor, an error instruction stream built into the microprocessor to break the microprocessor out of an error condition.

A non-limiting example microprocessor includes an instruction stream for executing instructions. The microprocessor further includes control logic for triggering an error condition monitoring logic. The microprocessor further includes the error condition monitoring logic for executing an error instruction stream built into the microprocessor to break the microprocessor out of an error condition.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide techniques for breaking a microprocessor out of an error condition by executing an interrupt that is invisible to software. Microprocessors are complex and often experience error conditions. Examples of such error conditions include situations where instructions are executing but unable to make forward progress (e.g., a live-lock) and the like. If not addressed, the system that the microprocessor is in will crash.

Conventional approaches to break the microprocessor out of an error condition involve flushing the instruction stream and refetching, taking an interrupt, triggering a microarchitectural event, resetting the logic via test facilities, and the like. However, these conventional approaches fail to allow for corrective instructions to be executed or the instructions have to be maintained by the software community (i.e., the third-party developers that develop third-party software programs to execute on the microprocessor).

One or more embodiments of the present invention provide technological improvements over current methods of microprocessor interrupts that require third-party software program knowledge and intervention. Disadvantages of contemporary approaches may include failing to allow for corrective instructions to be executed or require that the instructions are maintained by the software developers developing the third-party software program. One or more embodiments of the present invention provide technical solutions to one or more of these disadvantages of existing solutions by providing a software-invisible interrupt for a microprocessor that utilizes microprocessor-integrated logic to detect error scenarios and execute a series of instructions that are useful in breaking the microprocessor out of the error scenario. These instructions do not change the architectural state of the microprocessor and are invisible to the software community.

Figure 1:
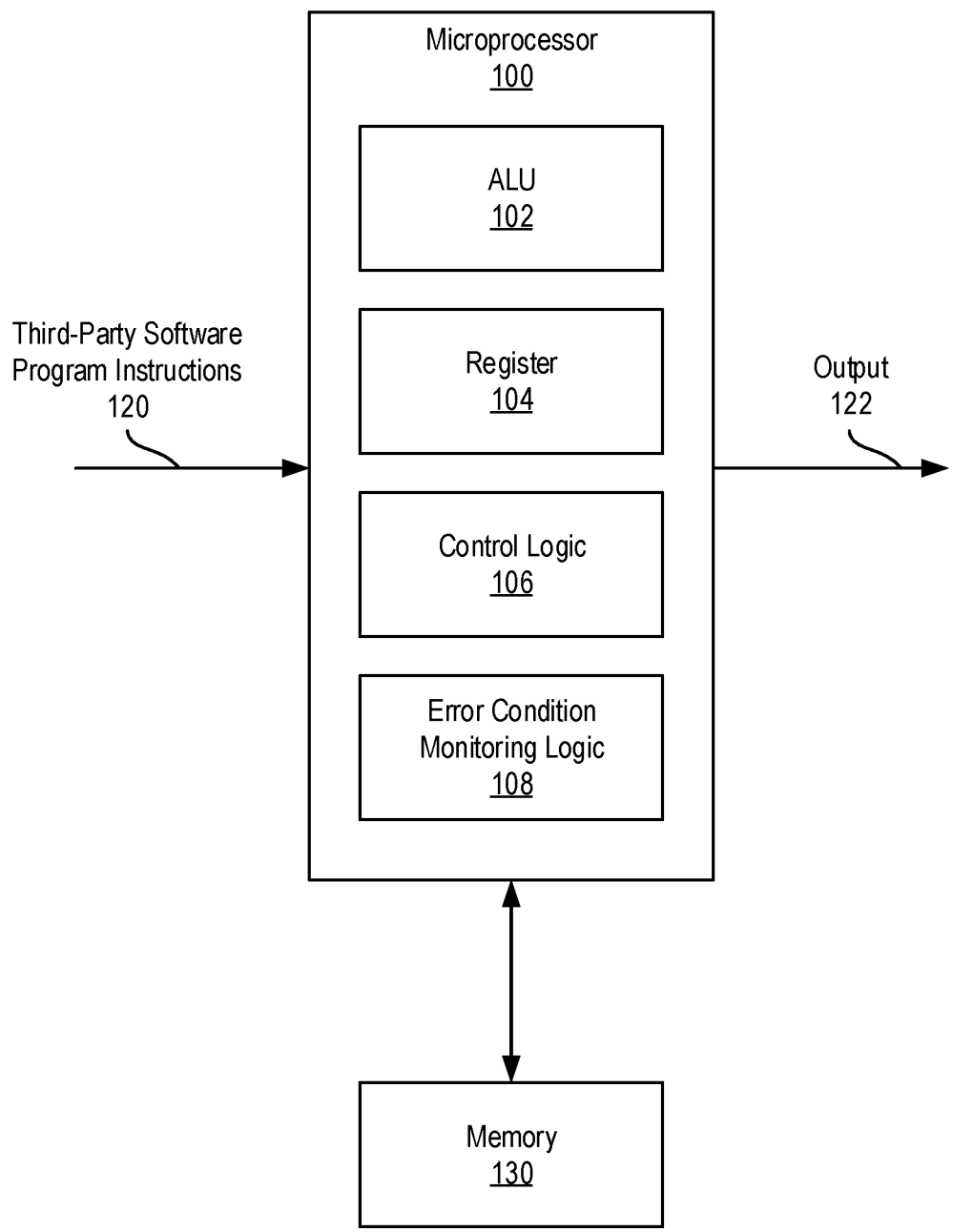
FIG. 1 depicts a block diagram of a microprocessor having error condition monitoring logic for performing software-invisible interrupts for the microprocessor according to one or more embodiments described herein.

Turning now to FIG. 1, a microprocessor 100 having error condition monitoring logic 108 for performing software-invisible interrupts for the microprocessor 100 is depicted according to one or more embodiments described herein. The microprocessor 100 includes an arithmetic logic unit (ALU) 102, a register 104, control logic 106, and the error condition monitoring logic 108. In the example of FIG. 1, the microprocessor 100 is communicatively coupled to a memory 130.

When the microprocessor 100 receives a third-party software program instructions 120, the microprocessor executes the instruction, for example, using the ALU 102, the register 104, and the control logic 106. The third-party software program instructions 120 is executed in an instruction stream of the microprocessor (see FIG. 3). In some example, executing the instruction involves the microprocessor 100 accessing information stored in the memory 130 and/or writing information to the memory 130. Once the third-party software program instructions 120 is executed, the microprocessor 100 generates an output 122.

While the microprocessor 100 executes the instructions, the control unit 106 monitors the microprocessor 100 to identify error conditions. According to an example, when the control logic 106 detects that the microprocessor 100 is in an error scenario (i.e., experiencing an error condition), the control logic 106 triggers the error condition monitoring logic 108, which is built into the microprocessor 100. According to another example, the control unit 106 triggers the error condition monitoring logic 108 randomly and/or at predefined intervals instead of (or in addition to) triggering the error condition monitoring logic 108 responsive to detecting an error condition. This is useful for correcting hard to detect error scenarios.

Once the error condition monitoring logic 108 is triggered, the error condition monitoring logic 108 causes the microprocessor 108 to vector to an error instruction stream built into the error condition monitoring logic 108. The error instruction stream is programmed by the design team for the microprocessor 100 to execute a series of instructions that are useful in breaking the microprocessor 100 out of the error scenario. These instructions do not change the architectural state of the microprocessor 100. Upon completion of these instructions in the error instruction stream, the error condition monitoring logic 108 returns control of the microprocessor 100 back to the control logic and thus back to the original instruction stream of the microprocessor 100 (not the error instruction stream of the error condition monitoring logic 108). This provides for multiple different series of instructions to be attempted that can be enabled to handle different types of error scenarios/conditions. As an example, in a test environment, it allows for the next level of error scenario to be discovered.

The various components, modules, engines, etc. described regarding FIG. 1 can be implemented as instructions stored on a computer-readable storage medium, as hardware modules, as special-purpose hardware (e.g., application-specific hardware, application-specific integrated circuits (ASICs), application-specific special processors (ASSPs), field-programmable gate arrays (FPGAs), as embedded controllers, hardwired circuitry, etc.), or as some combination or combinations of these. According to aspects of the present disclosure, the control logic 106 and/or the error condition monitoring logic 108 described herein can be a combination of hardware and programming. The programming can be processor executable instructions stored on a tangible memory, and the hardware can include the microprocessor 100 for executing those instructions. Thus a system memory (e.g., memory 130) or another memory can store program instructions that when executed by the microprocessor implement the logic described herein.

Figure 2:
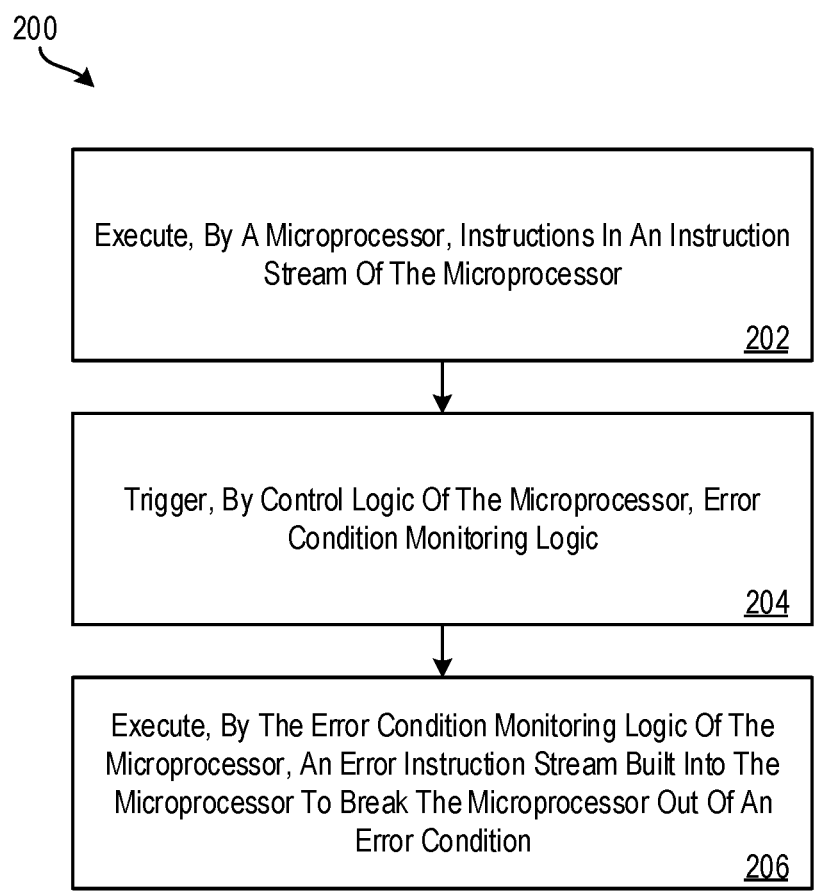
FIG. 2 depicts a flow diagram of a method for performing software-invisible interrupts for breaking the microprocessor of FIG. 1 out of an error condition according to one or more embodiments described herein.

FIG. 2 depicts a flow diagram of a method 200 for performing software-invisible interrupts for breaking the microprocessor 100 out of an error condition according to examples of the present disclosure. Although the features and functionality of the method 200 are described with reference to the microprocessor 100, they are not so limited and can apply to other processing devices (e.g., one or more of the processors 421 depicted in FIG. 4).

Figure 3:
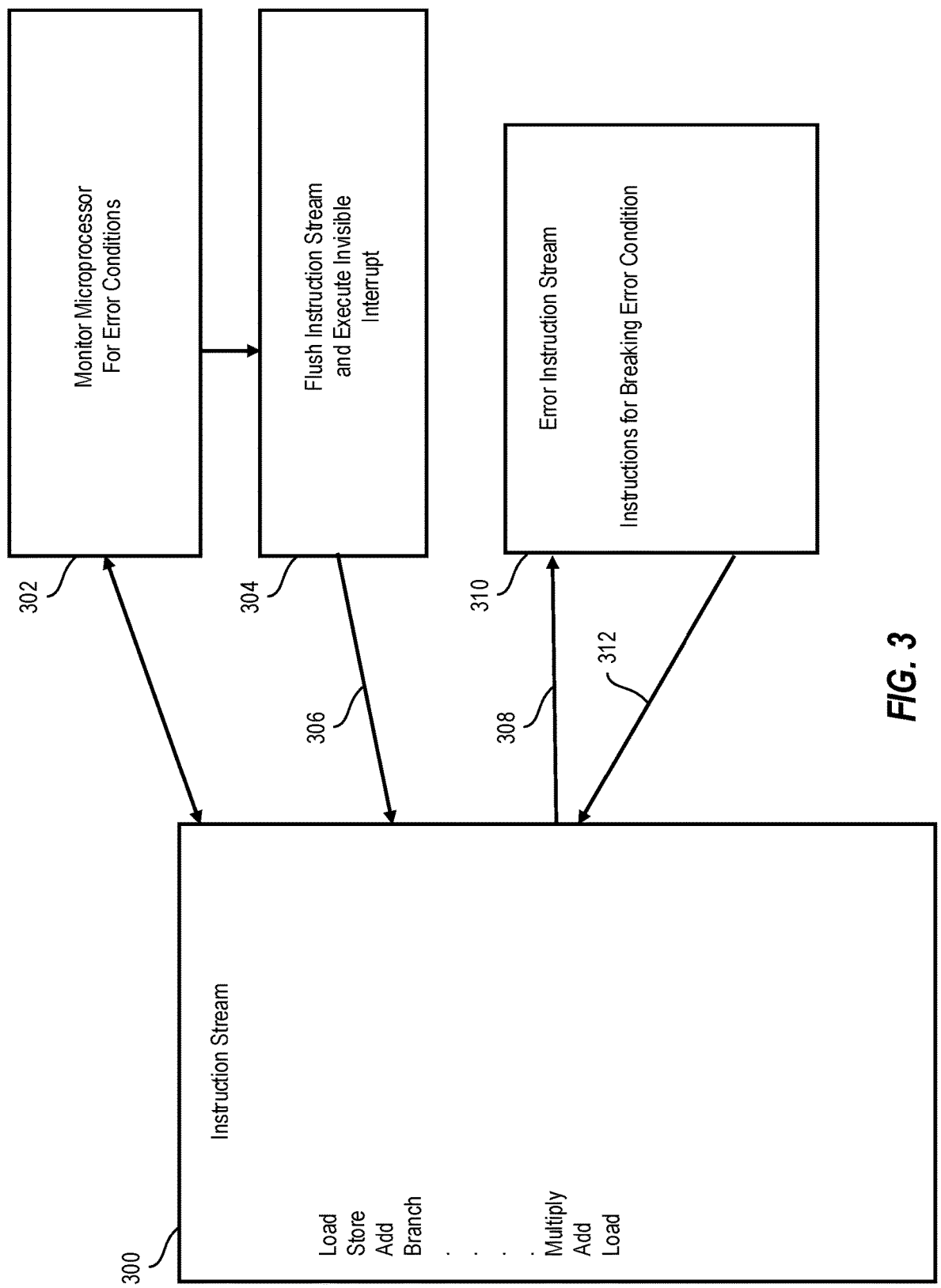
FIG. 3 depicts an instruction stream executing on a microprocessor according to one or more embodiments described herein.

At block 202, the microprocessor 100 executes instructions in an instruction stream of the microprocessor. Examples of such instructions include "load," "store," "add," "branch," and "multiply," among others. FIG. 3 depicts an instruction stream 300 executing on the microprocessor 100 and is described in more detail herein.

With continued reference to FIG. 2, at block 204, the control logic 106 of the microprocessor 100 triggers the error condition monitoring engine 108. The error condition monitoring engine 108 can be triggered in one or more ways and/or combinations of ways. For example, the error condition monitoring engine 108 is triggered responsive to the control logic detecting an error condition in the microprocessor 100. As another example, the error condition monitoring engine 108 is triggered responsive to the instruction stream (e.g., the instruction stream 300 of FIG. 3) detecting an error condition. As yet another example, the error condition monitoring engine 108 is triggered randomly (i.e., at random times). As yet another example, the error condition monitoring engine 108 is triggered at predefined intervals (e.g., every 100 instructions, every 1 millisecond, after every load instruction, etc.). Triggering the error condition monitoring engine 108 randomly and/or at predefined intervals enables error conditions that are otherwise difficult to detect to be corrected.

At block 206, the error condition monitoring logic 108, responsive to being triggered at step 204, executes an error instruction stream built into the microprocessor 100 to break the microprocessor out of an error condition. To accomplish this, the error condition monitoring logic 108 causes the instruction stream of the microprocessor 100 to be flushed and an invisible interrupt is initiated on the instruction stream of the microprocessor 100. The invisible interrupt is invisible to the third-party software program that generates the third-party software program instructions 120. The instruction stream on the microprocessor 100 then vectors to the error instruction stream. The vector is a pointer at which the instruction executing on the instruction stream of the microprocessor 100 changes to point to the error instruction stream of the error condition monitoring logic 108 instead of a next code instruction. Once vectored, the error instruction stream embedded into the hardware (i.e., as a special-purpose register) of the change condition monitoring logic 108 causes the microprocessor 100 to break the error condition.

Additional processes also may be included. For example, the microprocessor continues executing the instructions in the instruction stream (not the error instruction stream) of the microprocessor subsequent to breaking the microprocessor 100 out of the error condition. It should be understood that the process depicted in FIG. 2 represents an illustration, and that other processes may be added or existing processes may be removed, modified, or rearranged without departing from the scope of the present disclosure.

FIG. 3 depicts an instruction stream 300 executing on the microprocessor 100 according to one or more embodiments described herein. The instruction stream 300 executes the third-party software program instructions 120 of FIG. 1. Examples of such instructions include "load," "store," "add," "branch," and "multiply," among others.

The control logic 106 monitors the microprocessor 100 for error conditions at block 302 by monitoring the instruction stream 300. If an error condition is detected by the control logic 106, the error condition monitoring logic 108, at block 304, flushes the instruction stream 300 as shown by arrow 306 and the instruction stream 300 executes an invisible interrupt. The invisible interrupt is invisible to the third-party software program that generates the third-party software program instructions 120.

Once the invisible interrupt is executed on the instruction stream 300, the instruction stream 300 on the microprocessor 100 then vectors to the error instruction stream 310 as shown by arrow 308. The vector is a pointer at which the instruction executing on the instruction stream 300 of the microprocessor 100 changes to point to the error instruction stream 310 of the error condition monitoring logic 108 instead of a next code instruction on the instruction stream 300. Once vectored, the error instruction stream 310 embedded into the hardware (i.e., as a special-purpose register) of the error condition monitoring logic 108 causes the microprocessor 100 to break the error condition using instructions for breaking the error condition. Once the error condition is broken on the microprocessor 100 using the error instruction stream 310, the error instruction stream generates a return instruction to cause the instruction stream 300 to resume at the point where the invisible interrupt occurred.

Figure 4:
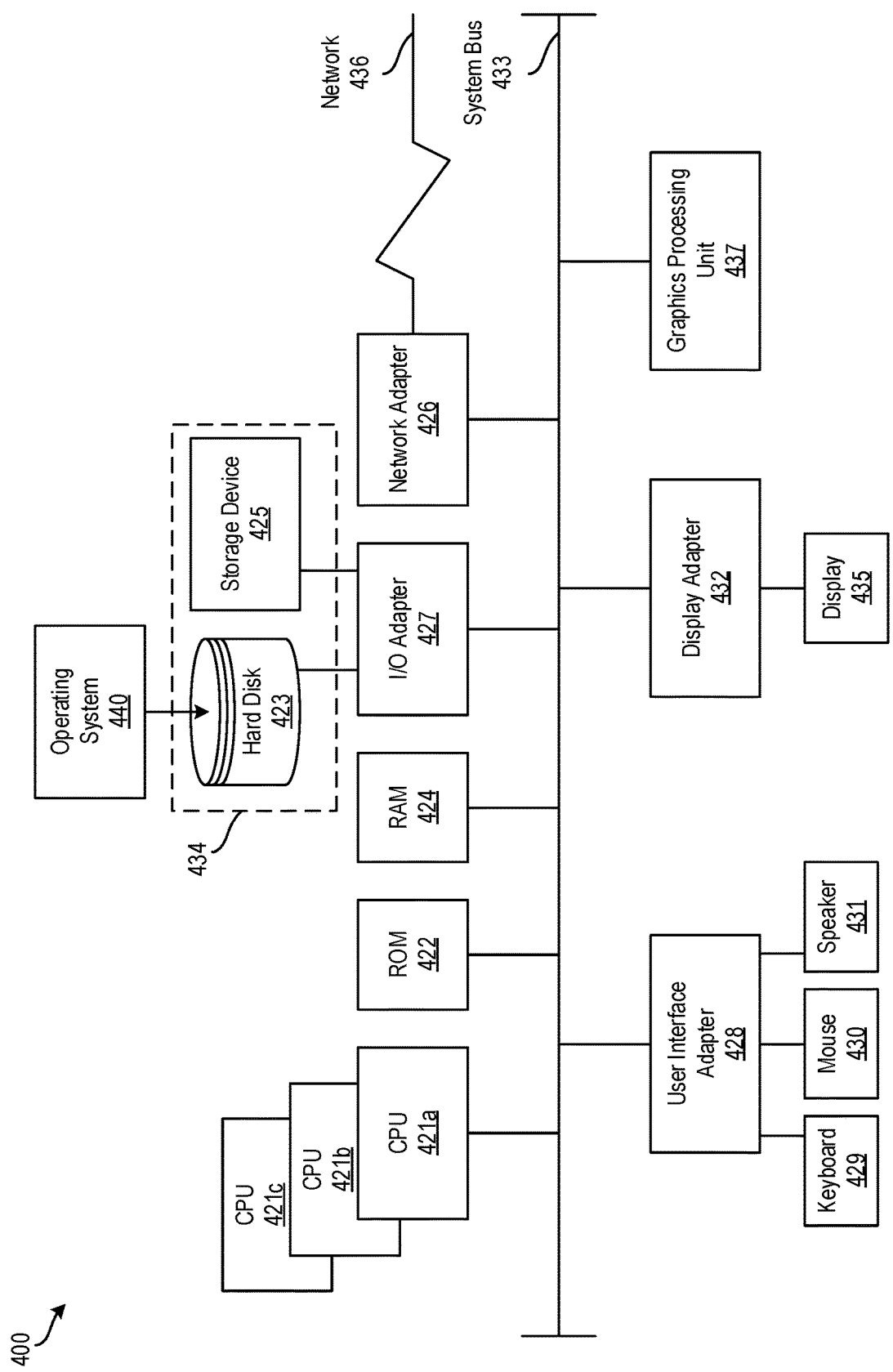
FIG. 4 depicts a block diagram of a processing system for implementing the presently described techniques according to one or more embodiments described herein.

It is understood that one or more embodiments described herein are capable of being implemented in conjunction with any other type of computing environment now known or later developed. For example, FIG. 4 depicts a block diagram of a processing system 400 for implementing the techniques described herein. In examples, processing system 400 has one or more central processing units ("processors" or "processing resources") 421a, 421b, 421c, etc. (collectively or generically referred to as processor(s) 421 and/or as processing device(s)). According to one or more embodiments described herein, one or more of the central processing units 421 is an example of the microprocessor 100 of FIG. 1. In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further depicted are an input/output (I/O) adapter 427 and a network adapter 426 coupled to system bus 433. I/O adapter 427 may be a small computer system interface (SCSI) adapter that communicates with a hard disk 423 and/or a storage device 425 or any other similar component. I/O adapter 427, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display (e.g., a display monitor) 435 is connected to system bus 433 by display adapter 432, which may include a graphics adapter to improve the performance of graphics intensive applications and a video controller. In one aspect of the present disclosure, adapters 426, 427, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 may be interconnected to system bus 433 via user interface adapter 428, which may include, for example, a Super I/O chip integrating multiple device adapters into a single integrated circuit.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 such as the AIX® operating system from IBM Corporation to coordinate the functions of the various components shown in processing system 400.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for invisible interrupt of a microprocessor, the method comprising:
    executing, by the microprocessor, instructions in an instruction stream of the microprocessor;
    triggering, by control logic of the microprocessor, error condition monitoring logic wherein the error condition monitoring logic is triggered randomly; and
    executing, by the error condition monitoring logic of the microprocessor, an error instruction stream built into the microprocessor to break the microprocessor out of an error condition.

2. The computer-implemented method of claim 1, wherein executing the error instruction stream does not change an architectural state of the microprocessor.

3. The computer-implemented method of claim 1, further comprising:
    subsequent to breaking the microprocessor out of the error condition, continuing executing the instructions in the instruction stream of the microprocessor.

4. The computer-implemented method of claim 1, wherein the microprocessor comprises an arithmetic logic unit and a register.

5. A microprocessor comprising:
    an instruction stream for executing instructions;
    control logic for triggering an error condition monitoring logic, wherein the error condition monitoring logic is triggered randomly; and
    the error condition monitoring logic for executing an error instruction stream built into the microprocessor to break the microprocessor out of an error condition.

6. The microprocessor of claim 5, wherein executing the error instruction stream does not change an architectural state of the microprocessor.

7. The microprocessor of claim 5, wherein the instruction stream continues to execute the instructions in the instruction stream of the microprocessor subsequent to breaking the microprocessor out of the error condition.

8. The microprocessor of claim 5, further comprising:
    an arithmetic logic unit; and
    a register.

* * * * *